United States Patent
Palmateer et al.

(10) Patent No.: US 7,164,520 B2
(45) Date of Patent: Jan. 16, 2007

(54) PACKAGING FOR AN INTERFEROMETRIC MODULATOR

(75) Inventors: Lauren Fay Palmateer, San Francisco, CA (US); Brian James Gally, San Rafael, CA (US); William J. Cummings, San Francisco, CA (US); Manish Kothari, Redwood City, CA (US); Clarence Chui, San Mateo, CA (US)

(73) Assignee: IDC, LLC, San Francisco, CA (US)

( * ) Notice: Subject to any disclaimer, the term of this patent is extended or adjusted under 35 U.S.C. 154(b) by 0 days.

(21) Appl. No.: 10/844,819

(22) Filed: May 12, 2004

(65) Prior Publication Data
US 2005/0254115 A1    Nov. 17, 2005

(51) Int. Cl.
*G02F 1/03*    (2006.01)
(52) U.S. Cl. .................. 359/245; 359/247; 359/259
(58) Field of Classification Search ................. 359/245
See application file for complete search history.

(56) References Cited

U.S. PATENT DOCUMENTS

| | | | |
|---|---|---|---|
| 2,534,846 A | 12/1950 | Ambrose et al. | 348/270 |
| 3,439,973 A | 4/1969 | Paul et al. | 359/486 |
| 3,443,854 A | 5/1969 | Weiss | 359/352 |
| 3,653,741 A | 4/1972 | Marks | 359/486 |
| 3,656,836 A | 4/1972 | de Cremoux et al. | 359/261 |
| 3,813,265 A | 5/1974 | Marks | 359/486 |
| 3,955,880 A | 5/1976 | Lierke | 359/291 |
| 4,036,360 A | 7/1977 | Deffeyes | 206/204 |
| 4,074,480 A | 2/1978 | Burton | 52/127.1 |
| 4,099,854 A | 7/1978 | Decker et al. | 359/278 |
| 4,228,437 A | 10/1980 | Shelton | 343/909 |
| 4,377,324 A | 3/1983 | Durand et al. | 359/578 |
| 4,389,096 A | 6/1983 | Hori et al. | 349/5 |
| 4,403,248 A | 9/1983 | te Velde | 348/755 |
| 4,431,691 A | 2/1984 | Greenlee | 428/34 |
| 4,441,791 A | 4/1984 | Hornbeck | 359/295 |

(Continued)

FOREIGN PATENT DOCUMENTS

EP    1418154 A2    12/2004

(Continued)

OTHER PUBLICATIONS

Akasaka, "Three-Dimensional IC Trends", Proceedings of IEEE, vol. 74, No. 12, pp. 1703-1714, (Dec. 1986).

(Continued)

*Primary Examiner*—Jordan Schwartz
*Assistant Examiner*—Jessica Stultz
(74) *Attorney, Agent, or Firm*—Knobbe Martens Olson & Bear LLP

(57) ABSTRACT

A package is made of a transparent substrate having an interferometric modulator and a back plate. A non-hermetic seal joins the back plate to the substrate to form a package, and a desiccant resides inside the package. A method of packaging an interferometric modulator includes providing a transparent substrate and manufacturing an interferometric modulator array on a backside of the substrate. A back plate is provided and a desiccant is applied to the back plate. The back plate is sealed to the backside of the substrate with a back seal in ambient conditions, thereby forming a package

39 Claims, 4 Drawing Sheets

U.S. PATENT DOCUMENTS

| | | | |
|---|---|---|---|
| 4,445,050 A | 4/1984 | Marks | 307/145 |
| 4,459,182 A | 7/1984 | te Velde | 205/122 |
| 4,482,213 A | 11/1984 | Piliavin et al. | 349/153 |
| 4,500,171 A | 2/1985 | Penz et al. | 349/190 |
| 4,519,676 A | 5/1985 | te Velde | 359/223 |
| 4,531,126 A | 7/1985 | Sadones | 342/173 |
| 4,566,935 A | 1/1986 | Hornbeck | 438/29 |
| 4,571,603 A | 2/1986 | Hornbeck et al. | 347/239 |
| 4,596,992 A | 6/1986 | Hornbeck | 347/134 |
| 4,615,595 A | 10/1986 | Hornbeck | 353/122 |
| 4,662,746 A | 5/1987 | Hornbeck | 359/223 |
| 4,663,083 A | 5/1987 | Marks | 252/583 |
| 4,681,403 A | 7/1987 | te Velde et al. | 349/41 |
| 4,710,732 A | 12/1987 | Hornbeck | 359/291 |
| 4,748,366 A | 5/1988 | Taylor | 310/328 |
| 4,786,128 A | 11/1988 | Birnbach | 385/8 |
| 4,790,635 A | 12/1988 | Apsley | 359/260 |
| 4,844,614 A * | 7/1989 | Henderson et al. | 356/451 |
| 4,856,863 A | 8/1989 | Sampsell et al. | 385/4 |
| 4,954,789 A | 9/1990 | Sampsell | 359/318 |
| 4,956,619 A | 9/1990 | Hornbeck | 359/317 |
| 4,977,009 A | 12/1990 | Anderson et al. | 428/76 |
| 4,982,184 A | 1/1991 | Kirkwood | 345/84 |
| 5,018,256 A | 5/1991 | Hornbeck | 438/23 |
| 5,022,745 A | 6/1991 | Zahowski et al. | 359/847 |
| 5,028,939 A | 7/1991 | Hornbeck et al. | 347/131 |
| 5,037,173 A | 8/1991 | Sampsell et al. | 385/17 |
| 5,044,736 A | 9/1991 | Jaskie et al. | 359/291 |
| 5,061,049 A | 10/1991 | Hornbeck | 359/224 |
| 5,075,796 A | 12/1991 | Schildkraut et al. | 359/247 |
| 5,078,479 A | 1/1992 | Vuilleumier | 359/290 |
| 5,079,544 A | 1/1992 | DeMond et al. | 345/84 |
| 5,083,857 A | 1/1992 | Hornbeck | 359/291 |
| 5,096,279 A | 3/1992 | Hornbeck et al. | 359/230 |
| 5,099,353 A | 3/1992 | Hornbeck | 359/241 |
| 5,124,834 A | 6/1992 | Cusano et al. | 359/291 |
| 5,142,405 A | 8/1992 | Hornbeck | 359/226 |
| 5,142,414 A | 8/1992 | Koehler | 359/578 |
| 5,153,771 A | 10/1992 | Link et al. | 359/286 |
| 5,162,787 A | 11/1992 | Thompson et al. | 345/32 |
| 5,168,406 A | 12/1992 | Nelson | 359/855 |
| 5,170,156 A | 12/1992 | DeMond et al. | 345/85 |
| 5,172,262 A | 12/1992 | Hornbeck | 359/223 |
| 5,179,274 A | 1/1993 | Sampsell | 250/208.2 |
| 5,192,395 A | 3/1993 | Boysel et al. | 216/13 |
| 5,192,946 A | 3/1993 | Thompson et al. | 348/764 |
| 5,206,629 A | 4/1993 | DeMond et al. | 345/206 |
| 5,214,419 A | 5/1993 | DeMond et al. | 345/32 |
| 5,214,420 A | 5/1993 | Thompson et al. | 345/6 |
| 5,216,537 A | 6/1993 | Hornbeck | 438/23 |
| 5,226,099 A | 7/1993 | Mignardi et al. | 385/19 |
| 5,231,532 A | 7/1993 | Magel et al. | 359/295 |
| 5,233,385 A | 8/1993 | Sampsell | 355/35 |
| 5,233,456 A | 8/1993 | Nelson | 359/214 |
| 5,233,459 A | 8/1993 | Bozler et al. | 359/230 |
| 5,244,707 A | 9/1993 | Shores | 428/76 |
| 5,254,980 A | 10/1993 | Hendrix et al. | 345/84 |
| 5,272,473 A | 12/1993 | Thompson et al. | 345/7 |
| 5,278,652 A | 1/1994 | Urbanus et al. | 348/571 |
| 5,280,277 A | 1/1994 | Hornbeck | 345/108 |
| 5,287,096 A | 2/1994 | Thompson et al. | 345/697 |
| 5,296,950 A | 3/1994 | Lin et al. | 359/9 |
| 5,304,419 A | 4/1994 | Shores | 428/355 R |
| 5,305,640 A | 4/1994 | Boysel et al. | 73/514.16 |
| 5,311,360 A | 5/1994 | Bloom et al. | 359/572 |
| 5,312,513 A | 5/1994 | Florence et al. | 216/24 |
| 5,323,002 A | 6/1994 | Sampsell et al. | 250/252.1 |
| 5,325,116 A | 6/1994 | Sampsell | 347/255 |
| 5,327,286 A | 7/1994 | Sampsell et al. | 359/561 |
| 5,331,454 A | 7/1994 | Hornbeck | 359/224 |
| 5,339,116 A | 8/1994 | Urbanus et al. | 348/716 |
| 5,365,283 A | 11/1994 | Doherty et al. | 348/743 |
| 5,381,253 A | 1/1995 | Sharp et al. | 349/18 |
| 5,401,983 A | 3/1995 | Jokerst et al. | 257/82 |
| 5,411,769 A | 5/1995 | Hornbeck | 427/534 |
| 5,444,566 A | 8/1995 | Gale et al. | 359/291 |
| 5,446,479 A | 8/1995 | Thompson et al. | 345/6 |
| 5,448,314 A | 9/1995 | Heimbuch et al. | 348/743 |
| 5,452,024 A | 9/1995 | Sampsell | 348/755 |
| 5,454,906 A | 10/1995 | Baker et al. | 216/66 |
| 5,457,493 A | 10/1995 | Leddy et al. | 348/164 |
| 5,457,566 A | 10/1995 | Sampsell et al. | 359/292 |
| 5,459,602 A | 10/1995 | Sampsell | 359/234 |
| 5,459,610 A | 10/1995 | Bloom et al. | 359/572 |
| 5,461,411 A | 10/1995 | Florence et al. | 347/240 |
| 5,489,952 A | 2/1996 | Gove et al. | 348/771 |
| 5,497,172 A | 3/1996 | Doherty et al. | 345/85 |
| 5,497,197 A | 3/1996 | Gove et al. | 348/388.1 |
| 5,499,062 A | 3/1996 | Urbanus | 348/771 |
| 5,500,635 A | 3/1996 | Mott | 340/323 R |
| 5,500,761 A | 3/1996 | Goossen et al. | 359/290 |
| 5,506,597 A | 4/1996 | Thompson et al. | 345/85 |
| 5,515,076 A | 5/1996 | Thompson et al. | 345/505 |
| 5,517,347 A | 5/1996 | Sampsell | 359/224 |
| 5,523,803 A | 6/1996 | Urbanus et al. | 348/771 |
| 5,526,051 A | 6/1996 | Gove et al. | 375/240.01 |
| 5,526,172 A | 6/1996 | Kanack | 359/291 |
| 5,526,688 A | 6/1996 | Boysel et al. | 73/514.38 |
| 5,535,047 A | 7/1996 | Hornbeck | 359/295 |
| 5,548,301 A | 8/1996 | Kornher et al. | 345/85 |
| 5,551,293 A | 9/1996 | Boysel et al. | 73/514.14 |
| 5,552,924 A | 9/1996 | Tregilgas | 359/224 |
| 5,563,398 A | 10/1996 | Sampsell | 235/454 |
| 5,567,334 A | 10/1996 | Baker et al. | 216/24 |
| 5,570,135 A | 10/1996 | Gove et al. | 348/581 |
| 5,579,149 A | 11/1996 | Moret et al. | 359/223 |
| 5,581,272 A | 12/1996 | Conner et al. | 345/85 |
| 5,583,688 A | 12/1996 | Hornbeck | 359/291 |
| 5,589,852 A | 12/1996 | Thompson et al. | 345/690 |
| 5,591,379 A | 1/1997 | Shores | 252/194 |
| 5,597,736 A | 1/1997 | Sampsell | 438/22 |
| 5,600,383 A | 2/1997 | Hornbeck | 348/771 |
| 5,602,671 A | 2/1997 | Hornbeck | 359/224 |
| 5,606,441 A | 2/1997 | Florence et al. | 349/33 |
| 5,608,468 A | 3/1997 | Gove et al. | 348/771 |
| 5,610,438 A | 3/1997 | Wallace et al. | 257/682 |
| 5,610,624 A | 3/1997 | Bhuva | 345/84 |
| 5,610,625 A | 3/1997 | Sampsell | 345/84 |
| 5,619,059 A | 4/1997 | Li et al. | 257/431 |
| 5,619,365 A | 4/1997 | Rhoads et al. | 359/248 |
| 5,619,366 A | 4/1997 | Rhoads et al. | 359/248 |
| 5,636,052 A | 6/1997 | Arney et al. | 359/291 |
| 5,646,768 A | 7/1997 | Kaeiyama | 359/224 |
| 5,650,881 A | 7/1997 | Hornbeck | 359/871 |
| 5,654,741 A | 8/1997 | Sampsell et al. | 345/158 |
| 5,657,099 A | 8/1997 | Doherty et al. | 348/743 |
| 5,659,374 A | 8/1997 | Gale, Jr. et al. | 348/771 |
| 5,665,997 A | 9/1997 | Weaver et al. | 257/414 |
| 5,703,710 A | 12/1997 | Brinkman et al. | 359/283 |
| 5,710,656 A | 1/1998 | Goossen | 359/291 |
| 5,739,945 A | 4/1998 | Tayebati | 359/291 |
| 5,745,193 A | 4/1998 | Urbanus et al. | 348/771 |
| 5,745,281 A | 4/1998 | Yi et al. | 359/290 |
| 5,771,116 A | 6/1998 | Miller et al. | 359/295 |
| 5,784,190 A | 7/1998 | Worley | 359/291 |
| 5,784,212 A | 7/1998 | Hornbeck | 359/871 |
| 5,815,141 A | 9/1998 | Phares | 345/173 |
| 5,818,095 A | 10/1998 | Sampsell | 257/435 |
| 5,825,528 A | 10/1998 | Goosen | 359/291 |
| 5,835,255 A | 11/1998 | Miles | 359/291 |
| 5,842,088 A | 11/1998 | Thompson | 399/177 |
| 5,853,662 A | 12/1998 | Watanabe | 422/40 |
| 5,912,758 A | 6/1999 | Knipe et al. | 359/290 |
| 5,939,785 A | 8/1999 | Klonis et al. | 257/729 |

| | | | |
|---|---|---|---|
| 5,986,796 A | 11/1999 | Miles | 359/260 |
| 6,028,690 A | 2/2000 | Carter et al. | 359/224 |
| 6,038,056 A | 3/2000 | Florence et al. | 359/290 |
| 6,040,937 A | 3/2000 | Miles | 359/291 |
| 6,049,317 A | 4/2000 | Thompson et al. | 345/85 |
| 6,055,090 A | 4/2000 | Miles | 359/291 |
| 6,061,075 A | 5/2000 | Nelson et al. | 347/134 |
| 6,099,132 A | 8/2000 | Kaeriyama | 359/872 |
| 6,113,239 A | 9/2000 | Sampsell et al. | 353/31 |
| 6,147,790 A | 11/2000 | Meier et al. | 359/291 |
| 6,160,833 A | 12/2000 | Floyd et al. | 372/96 |
| 6,180,428 B1 | 1/2001 | Peeters et al. | 438/22 |
| 6,201,633 B1 | 3/2001 | Peeters et al. | 359/296 |
| 6,232,936 B1 | 5/2001 | Gove et al. | 345/85 |
| 6,238,755 B1 | 5/2001 | Harvey et al. | 429/34 |
| 6,282,010 B1 | 8/2001 | Sulzbach et al. | 359/223 |
| 6,295,154 B1 | 9/2001 | Laor et al. | 359/223 |
| 6,323,982 B1 | 11/2001 | Hornbeck | 359/224 |
| 6,447,126 B1 | 9/2002 | Hornbeck | 359/871 |
| 6,465,355 B1 | 10/2002 | Horsley | 438/694 |
| 6,466,358 B1 | 10/2002 | Tew | 359/292 |
| 6,473,274 B1 | 10/2002 | Maimone et al. | 360/294.5 |
| 6,480,177 B1 | 11/2002 | Doherty et al. | 345/84 |
| 6,496,122 B1 | 12/2002 | Sampsell | 340/825.69 |
| 6,545,335 B1 | 4/2003 | Chua et al. | 257/499 |
| 6,548,908 B1 | 4/2003 | Chua et al. | 257/773 |
| 6,549,338 B1 | 4/2003 | Wolverton et al. | 359/634 |
| 6,552,840 B1 | 4/2003 | Knipe | 359/291 |
| 6,574,033 B1 | 6/2003 | Chui et al. | 359/291 |
| 6,589,625 B1 | 7/2003 | Kothari et al. | 428/46 |
| 6,600,201 B1 | 7/2003 | Hartwell et al. | 257/415 |
| 6,606,175 B1 | 8/2003 | Sampsell et al. | 398/140 |
| 6,625,047 B1 | 9/2003 | Coleman, Jr. | 365/51 |
| 6,630,786 B1 | 10/2003 | Cummings et al. | 313/553 |
| 6,632,698 B1 | 10/2003 | Ives | 438/52 |
| 6,643,069 B1 | 11/2003 | Dewald | 359/629 |
| 6,650,455 B1 | 11/2003 | Miles | 359/291 |
| 6,666,561 B1 | 12/2003 | Blakley | 359/877 |
| 6,674,562 B1 | 1/2004 | Miles | 359/291 |
| 6,680,792 B1 | 1/2004 | Miles | 359/291 |
| 6,710,908 B1 | 3/2004 | Miles et al. | 359/290 |
| 6,741,377 B1 | 5/2004 | Miles | 359/243 |
| 6,741,384 B1 | 5/2004 | Martin et al. | 359/291 |
| 6,741,503 B1 | 5/2004 | Farris et al. | 365/189.05 |
| 6,747,785 B1 | 6/2004 | Chen et al. | 359/291 |
| 6,775,174 B1 | 8/2004 | Huffman et al. | 365/149 |
| 6,778,155 B1 | 8/2004 | Doherty et al. | 345/85 |
| 6,794,119 B1 | 9/2004 | Miles | 430/313 |
| 6,811,267 B1 | 11/2004 | Allen et al. | 353/122 |
| 6,819,469 B1 | 11/2004 | Koba | 359/290 |
| 6,822,628 B1 | 11/2004 | Dunphy et al. | 345/75.2 |
| 6,829,132 B1 | 12/2004 | Martin et al. | 361/278 |
| 6,853,129 B1 | 2/2005 | Cummings et al. | 313/495 |
| 6,855,610 B1 | 2/2005 | Tung et al. | 438/299 |
| 6,859,218 B1 | 2/2005 | Luman et al. | 347/139 |
| 6,861,277 B1 | 3/2005 | Monroe et al. | 438/48 |
| 6,862,022 B1 | 3/2005 | Slupe | 345/207 |
| 6,862,029 B1 | 3/2005 | D'Souza et al. | 345/690 |
| 6,867,896 B1 | 3/2005 | Miles | 359/290 |
| 6,870,581 B1 | 3/2005 | Li et al. | 348/756 |
| 2001/0003487 A1 | 6/2001 | Miles | 359/260 |
| 2002/0015215 A1 | 2/2002 | Miles | 359/290 |
| 2002/0024711 A1 | 2/2002 | Miles | 359/247 |
| 2002/0054424 A1 | 5/2002 | Miles | 359/291 |
| 2002/0056900 A1 | 5/2002 | Liu et al. | 257/687 |
| 2002/0075555 A1 | 6/2002 | Miles | 359/291 |
| 2002/0126364 A1 | 9/2002 | Miles | 359/247 |
| 2003/0043157 A1 | 3/2003 | Miles | 345/540 |
| 2003/0062186 A1 | 4/2003 | Boroson et al. | 174/522 |
| 2003/0072070 A1 | 4/2003 | Miles | 359/260 |
| 2003/0108306 A1 | 6/2003 | Whitney et al. | |
| 2003/0184412 A1 | 10/2003 | Gorrell | |
| 2003/0202264 A1 | 10/2003 | Weber et al. | 359/877 |
| 2003/0202265 A1 | 10/2003 | Reboa et al. | 359/877 |
| 2003/0202266 A1 | 10/2003 | Ring et al. | 359/877 |
| 2004/0051929 A1 | 3/2004 | Sampsell et al. | 359/247 |
| 2004/0058532 A1 | 3/2004 | Miles et al. | 438/689 |
| 2004/0061492 A1 | 4/2004 | Lopes et al. | |
| 2004/0080807 A1 | 4/2004 | Chen et al. | 359/291 |
| 2004/0100677 A1 | 5/2004 | Huibers et al. | |
| 2004/0145049 A1 | 7/2004 | McKinnell et al. | 257/719 |
| 2004/0147056 A1 | 7/2004 | McKinnell et al. | 438/52 |
| 2004/0160143 A1 | 8/2004 | Shreeve et al. | 310/309 |
| 2004/0174583 A1 | 9/2004 | Chen et al. | 359/290 |
| 2004/0179281 A1 | 9/2004 | Reboa | 359/872 |
| 2004/0212026 A1 | 10/2004 | Van Brocklin et al. | 257/414 |
| 2004/0217378 A1 | 11/2004 | Martin et al. | 257/200 |
| 2004/0217919 A1 | 11/2004 | Pichl et al. | 345/31 |
| 2004/0218251 A1 | 11/2004 | Piehl et al. | 359/290 |
| 2004/0218334 A1 | 11/2004 | Martin et al. | 361/139 |
| 2004/0218341 A1 | 11/2004 | Martin et al. | 361/278 |
| 2004/0227493 A1 | 11/2004 | Van Brocklin et al. | 320/166 |
| 2004/0240032 A1 | 12/2004 | Miles | 359/290.1 |
| 2004/0240138 A1 | 12/2004 | Martin et al. | 361/139 |
| 2004/0245588 A1 | 12/2004 | Nikkel et al. | 257/415 |
| 2004/0263944 A1 | 12/2004 | Miles et al. | 359/290 |
| 2005/0001828 A1 | 1/2005 | Martin et al. | 345/204 |
| 2005/0038950 A1 | 2/2005 | Adelmann | 711/71 |
| 2005/0057442 A1 | 3/2005 | Way | 345/9 |
| 2005/0068583 A1 | 3/2005 | Gutkowski et al. | 358/1.18 |
| 2005/0069209 A1 | 3/2005 | Damera-Venkata et al. | 359/292 |
| 2005/0074919 A1 | 4/2005 | Patel et al. | |
| 2005/0247477 A1* | 11/2005 | Kothari et al. | 174/52.4 |
| 2005/0253283 A1 | 11/2005 | DCamp et al. | |

FOREIGN PATENT DOCUMENTS

| | | |
|---|---|---|
| WO | WO9530924 | 11/1995 |
| WO | WO9717628 | 5/1997 |
| WO | WO9952006 A2 | 10/1999 |
| WO | WO9952006 A3 | 10/1999 |
| WO | WO03007049 A1 | 1/2003 |
| WO | WO03069413 A1 | 8/2003 |
| WO | WO03073151 A1 | 9/2003 |
| WO | WO04006003 A1 | 1/2004 |
| WO | WO04026757 A2 | 4/2004 |

OTHER PUBLICATIONS

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

Aratani K., et al., "Surface micromachined tuneable interferometer array," Sensors and Actuators, pp. 17-23. (1994).

Conner, "Hybrid Color Display Using Optical Interference Filter Array," SID Digest, pp. 577-580 (1993).

Goossen et al., "Possible Display Applications of the Silicon Mechanical Anti-Reflection Switch," Society for Information Display (1994).

Goossen et al., "Silicon Modulator Based on Mechanically-Active Anti-Reflection Layer with 1Mbit/sec Capability for Fiber-in-the-Loop Applications," IEEE Photonics Technology Letters, pp. 1119-1121 (Sep. 1994).

Gosch, "West Germany Grabs the Lead in X-Ray Lithography," Electronics pp. 78-80 (Feb. 5, 1987).

Howard et al., "Nanometer-Scale Fabrication Techniques", VLSI Electronics: Microstructure Science, vol. 5,. pp. 145-153 and pp. 166-173 (1982).

Jackson "Classical Electrodynamics", John Wiley & Sons Inc., pp. 568-573. date unknown.

Jerman et al., "A Miniature Fabry-Perot Interferometer with a Corrugated Silicon Diaphragm Support", (1988).

Johnson "Optical Scanners", Microwave Scanning Antennas, vol. 1, p. 251-261, (1964).

Light over Matter, Circle No. 36 (Jun. 1993).

Miles, Mark, W., "A New Reflective FPD Technology Using Interferometric Modulation", The Proceedings of the Society for Information Display (May 11-16, 1997).

Newsbreaks, "Quantum-trench devices might operate at terahertz frequencies", Laser Focus World (May 1993).

Oliner et al., "Radiating Elements and Mutual Coupling", Microwave Scanning Antennas, vol. 2, pp. 131-141, (1966).

Raley et al., "A Fabry-Perot Microinterferometer for Visible Wavelengths", IEEE Solid-State Sensor and Actuator Workshop, Jun. 1992, Hilton Head, SC.

Sperger et al., "High Performance Patterned All-Dielectric Interference Colour Filter for Display Applications", SID Digest, pp. 81-83, (1994).

Stone, "Radiation and Optics, An Introduction to the Classical Theory", McGraw-Hill, pp. 340-343, (1963).

Walker, et al., "Electron-beam-tunable Interference Filter Spatial Light Modulator", Optics Letters, vol. 13, No. 5, pp. 345-347, (May 1988).

Winton, John M., "A novel way to capture solar energy", Chemical Week, (May 1985).

Wu, "Design of a Reflective Color LCD Using Optical Interference Reflectors", ASIA Display '95, pp. 929-931, (Oct. 1995).

Marco Moraja and Marco Amiotti, Advanced Getter Solutions at Wafer Level to Assure High Reliability to the Last Generations MEMs, 2003, pp. 458-459, 0-7803-7649-8/03, IEEE, Texas.

D. Sparks, S. Massoud-Ansari, and N. Najafi, Chip-Level Vacuum Packaging of Micromachines Using NanoGetters, Aug. 2003, vol. 26, No. 3, IEEE, Michigan

* cited by examiner

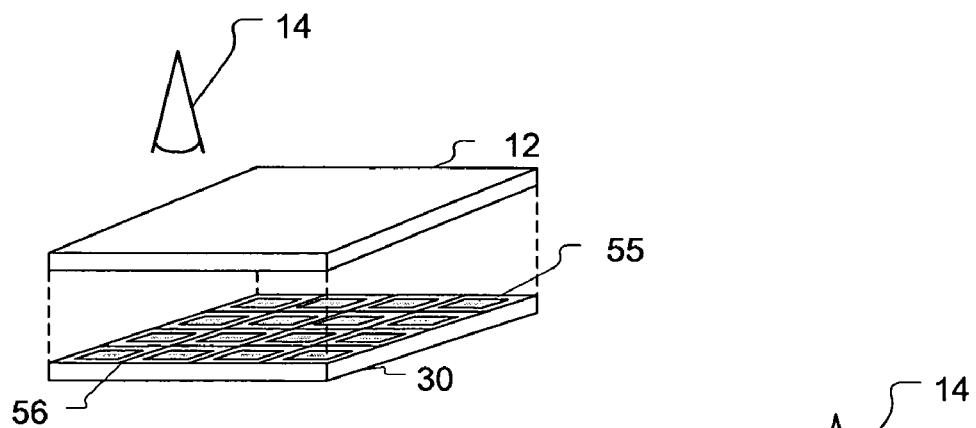
Figure 4
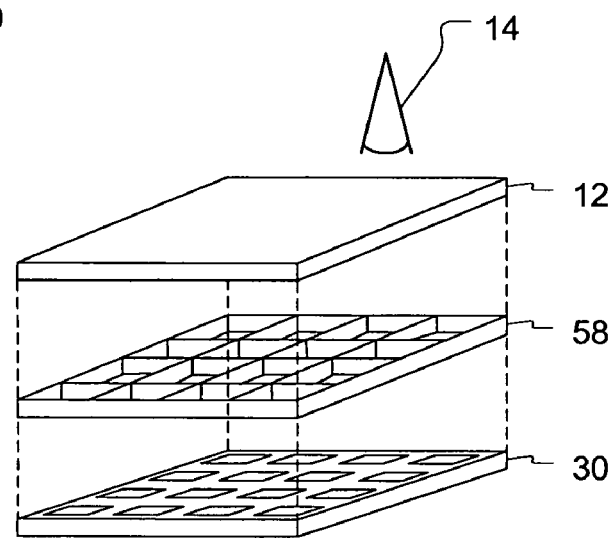
Figure 5
Figure 6
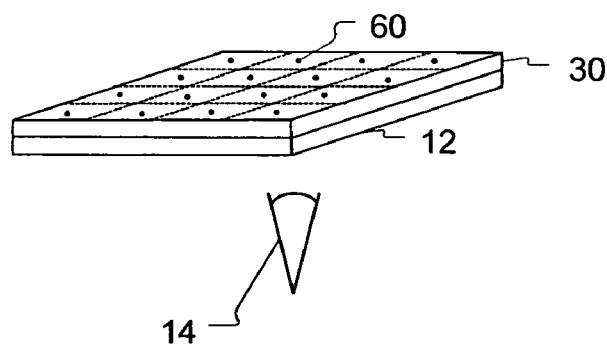

PACKAGING FOR AN INTERFEROMETRIC MODULATOR

BACKGROUND

Interferometric modulators are spatial light modulators typically used in display applications. These modulators use interference effects to control the intensity and the color of the light seen by a viewer. One example of such a modulator is the iMoD™. The iMoD employs a cavity having at least one movable or deflectable wall. As the wall, typically comprised at least partly of metal, moves towards a front surface of the cavity, interference occurs that affects the color of light viewed at the front surface. The front surface is typically the surface where the image seen by the viewer appears, as the iMoD is a direct-view device.

The front surface is transparent, as it is the portion of the device through which the viewer views the image. Manufacture of an interferometric modulator is somewhat similar to other types of devices manufactured on glass, such as liquid crystal devices (LCD). However, due to the unique nature of the device, packaging of the device has some other considerations.

Interferometric modulators are microelectromechanical systems (MEMS) devices. While they use a glass substrate like LCDs, they also have moving parts and must have room to move while remaining protected. Similarly, while they are MEMS devices, they are manufactured on a substrate that has different processing considerations than most MEMS devices.

There are some degrees of freedom available to interferometric modulators not available to either LCDs or many MEMS devices. Unlike LCDs, interferometric modulators do not have material injected into the package, such as the liquid crystalline material is into LCD display panels. Unlike many MEMS devices, interferometric modulators do not have parts that rub against one another, alleviating concerns about internal particle generation.

BRIEF DESCRIPTION OF THE DRAWINGS

The invention may be best understood by reading the disclosure with reference to the drawings, wherein:

FIG. 4 shows an embodiment of a back plate having recessed regions.

FIG. 5 shows an embodiment of a back plate having recessed regions formed by a frame applied to the substrate.

FIG. 6 shows an embodiment of a package having a hole for application of desiccant.

DETAILED DESCRIPTION OF THE EMBODIMENTS

Figure 1A:
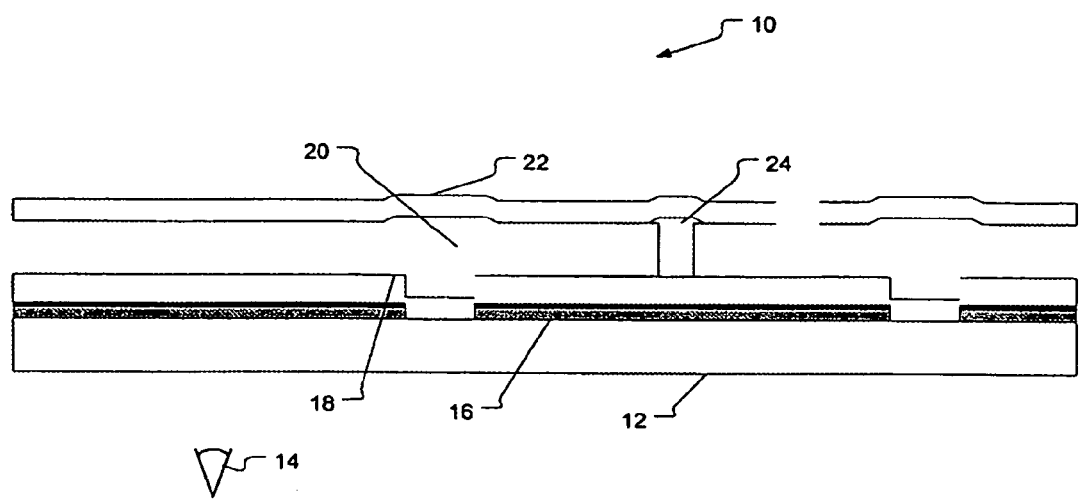
FIGS. 1a and 1b show an example of an interferometric modulator array.
Figure 1B:
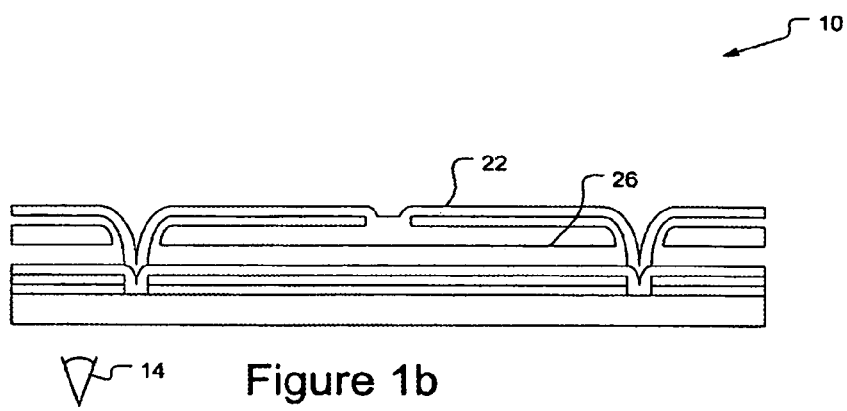

Interferometric modulators, such as the iMoD™, rely upon interference effects operating on light inside the cavity to modulate the light in accordance with image data. Cross-sectional views of such a modulator 10 are shown in FIGS. 1a and 1b. In this embodiment, the viewing surface would be at the 'bottom' of the picture, as shown by the viewer eye 14. The modulator array is formed on a transparent substrate 12. An optical stack 16 forms a first optically active surface that may be affected by the second optically active surface, the mechanical or mirror layer 22. A dielectric layer 18 typically protects the optical stack layer. The mechanical layer 22 is supported by posts such as 24, with the location of posts forming the individual elements of the array.

When the circuitry on the substrate, not shown, is activated in a particular region under the mechanical layer, such as that portion that is suspended over cavity 20, the mechanical layer deflects towards the optical stack 16. As it deflects, the mechanical layer causes the portion of the optical stack as seen by the viewer to appear black. Therefore, by addressing the mechanical layer with image data, an image would be seen by the viewer. This particular embodiment of an interferometric modulator may be referred to as a monolithic interferometric modulator here. This embodiment and those similar to it will be referred to as a membrane interferometric modulator.

In an alternative embodiment of an interferometric modulator shown in FIG. 1b, the mirror 26 that causes the pixel to appear black when deflected is separated from the support layer 22. This may be referred to as a separable modulator here. In either case, the package in which the modulator is encapsulated must account for moisture inside the package that can cloud the transparent substrate 12, as well as any outgassing that may occur from the structure of the modulator layers or package materials. It has some degrees of freedom in that there are no particulates generated by the operation of the device and the devices may be packaged in ambient conditions.

Figure 2:
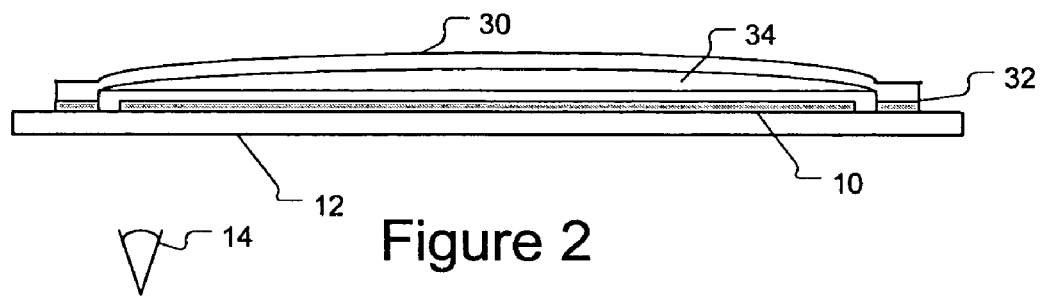
FIG. 2 shows a side view of an embodiment of an interferometric modulator package.

FIG. 2 shows an embodiment of an interferometric modulator in a package. The package is formed between the transparent substrate 12, with the modulator 10 on the 'back side' of the substrate relative to the viewer 14, and a back plate 30. The transparent substrate and the back plate can be joined with a non-hermetic seal 32 joining the back plate to the substrate to form a package. Generally, the package will contain a desiccant such as 34 between the backside of the modulator array and the back plate. This allows for control of the moisture inside the package.

Desiccants are used in other device packages, being a fairly effective means to control moisture inside the package. Desiccants may be used for packages that do or do not have hermetic seals. Hermetic seal, as that term is used here, refers to a seal that is complete, especially with regard to air and water vapor flow. In devices with a hermetic seal, desiccants are typically applied to control moisture resident inside the package. If the package does not have a hermetic seal, a desiccant may be used to control moisture moving into the package.

In the package, the transparent substrate may be any transparent substance that is capable of having thin film, MEMS devices built upon it. Examples include glass, plastic, and transparent polymers. Similarly, the interferometric modulators may be membrane modulators, or modulators of the separable type.

The back plate and the transparent substrate, when brought together may have recessed regions or cavities formed in between them where the modulator arrays reside. The back plate may be glass, metal, foil, polymer, plastic, and ceramic or semiconductor materials such as silicon. The seal between the transparent substrate and the back plate may be an epoxy-based adhesive, o-rings, a PIB, polyurethane, thin film metal weld, liquid spin-on glass, solder, polymers, and plastics, among others.

Generally, the desiccant is used to control moisture, so any substance that can trap moisture while not interfering with the optical properties of the modulators may be used. Examples include zeolites, molecular sieves, surface adsorbents, bulk adsorbents, and chemical reactants.

In order to provide this type of package to interferometric modulators, cost and complexity become a concern. It is generally desirable to manufacture several arrays of modulators on one transparent substrate, apply the back plate and then split the substrate into individual devices. Some parts of the packaging process may be applied before the division into individual devices as well as after the division.

Figure 3:
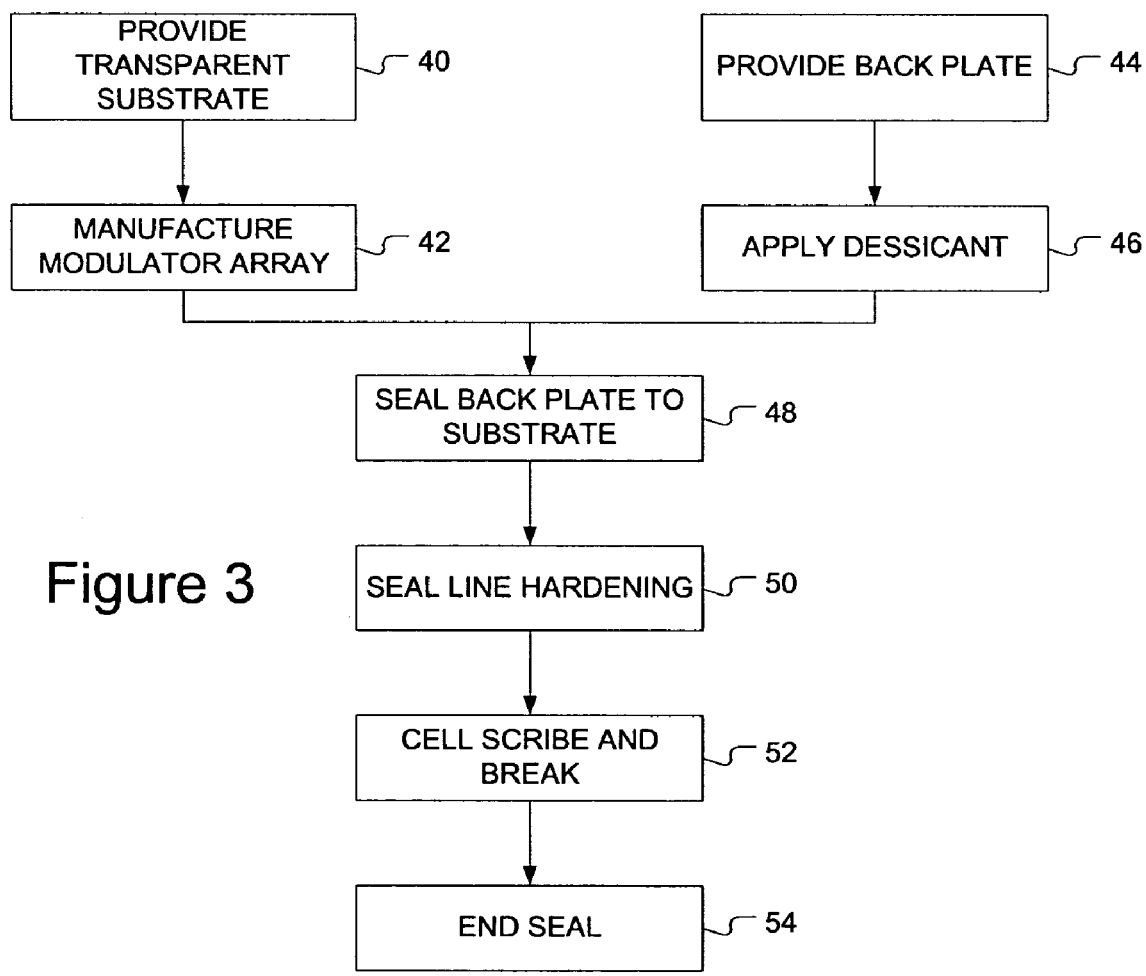
FIG. 3 shows a flow chart of an embodiment of a method to package interferometric modulators.

FIG. 3 shows a method of packaging an interferometric modulator. A transparent substrate is provided at 40 and the modulator array is provided at 42. For faster processing times, as well as more efficient use of the manufacturing lines, it may be desirable to process the back plate at the same time as the transparent substrate. However, this is merely one option and is not required. The back plate is provided at 44 and the desiccant applied at 46. Application of the desiccant may be accomplished after the process of joining the substrate to the back plate, typically by a process of injection, as will be discussed further.

The back plate and the backside, relative to the viewer 14 of FIG. 2, of the transparent substrate are sealed in ambient conditions to form the package. Ambient conditions as used here mean any combination of conditions, such as temperature, pressure or environmental, in which it would not be practical to package other types of devices. More than likely, the variation from what is typically considered ambient, conditions of room temperature and room pressure would occur with regard to the pressure.

For example, the packaging process may be accomplished with a starting low pressure subsequently varied to a higher pressure during the sealing process, which may aid in the formation of a good seal between the substrate and the back plate. The pressure may start at vacuum, reach an intermediate pressure and then a higher pressure; may start at a low pressure and go to a higher pressure and any combination in between. Alternatively, the pressure may start at a first pressure and then vary to a low pressure.

Alternatively, the packaging process may be accomplished in a vacuum, pressure between a vacuum up to and including ambient pressure, or pressure higher than ambient pressure and also including a varied and controlled high or low pressure during the sealing process. There may be advantages to packaging the arrays in a completely dry environment, but it is not necessary. Similarly, the packaging environment may be of an inert gas at ambient conditions. The ability to package the devices in ambient conditions allows for a much lower cost procedure and potential for versatility in equipment choice since the device can be transported through ambient conditions without effecting the operation of device.

Many variations on pressures used during packaging could be employed. For example, sealing the back plate could be accomplished in an environment having a initial vacuum, where environmental pressure increases from vacuum to a higher pressure as sealing occurs such that, as pressure in the package increases due to reduced volume, increased environmental pressure aids in creating a good seal.

In another example, the back plate could be sealed in an environment having a initial pressure higher than vacuum up to an including ambient pressure, where environmental pressure then increases to a higher pressure than the initial pressure as sealing occurs such that, as pressure in the package increases due to reduced volume, increased environmental pressure aids in creating a good seal.

In another example, the back plate could be sealed in an environment having an initial environmental pressure higher than ambient pressure, wherein the environmental pressure then increases to a higher pressure than the initial pressure as sealing occurs such that, as pressure in the package increases due to reduced volume, increased environmental pressure aids in creating a good seal.

In the above examples, a partial adhesive curing process in combination with the variation on pressure could affect the shape of the package. For example, the increased pressure inside the package during sealing may create a convex backplane shape by partial adhesive curing during a period of time in which the package is at the higher pressure.

Once the back plate and the substrate are joined, there may be a hardening of the seal. In order to differentiate between the seal between the back plate and the substrate, and seals that may be applied after division into individual arrays, the seal between the back plate and the substrate is referred to here as the back seal. This is the seal that may be hardened, if necessary.

Once the seal is hardened, if necessary, the substrate is scribed or otherwise prepared for division. The wafer may be mechanically scribed or laser scribed. The substrate is then broken into individual devices. This may be an actual breaking process, or may even be a sawing process, among other examples. Depending upon the seal, as well as other factors, it may become necessary after the division to apply an end seal to the packages, to complete the package. The endseal can be referred to as an opening in an otherwise continuous perimeter seal or the use of a continuous perimeter seal in combination with a hole in the back plate. To apply an endseal to the package may involve sealing the hole in the perimeter seal or sealing the hole in the back plate, whichever is acting as the endseal port.

The interferometric modulator will generally be formed on the transparent substrate and the back plate will be recessed to accommodate the modulators and desiccant and allow the modulators to continue to function. For example, providing a back plate in FIG. 3 may involve providing a back plate having recessed regions within which the interferometric modulator manufactured on the transparent substrate will fit. An example of this is shown in FIG. 4. The back plate 30 has regions 56 that are recessed regions in which the modulators will be accommodated. The 'footprints' of the modulators on the backside of the transparent substrate 12 are shown by the shaded regions 55. The back plate 30 is sealed to the transparent substrate and the modulators are encased in the recessed regions 56.

It must be noted that recessed regions are not necessary, but may lead to a longer lifetime of the device. For applications in systems which have reduced lifetimes, or in which a reduce lifetime is desired, the back plate may not have recessed regions. The recessing could be accomplished by application of a thicker seal material, or an external fillet. However, since the seal material does not form a hermetic seal, the thicker seal may allow more water vapor or other contaminants to enter the package, reducing the lifetime of the device.

The recessed regions could be formed in many different ways. One example would for the recessed regions by forming ribs on the back plate, such as by slurried glass. Another example would be to printing a seal material on the back plate in a pattern to form the ribs. The ribs could be deposited, or stenciled. The recessed regions could be formed in the back plate itself by eroding portions of the back plate, such as by sandblasting or etching. The back plate could be molded or sagged to form the recessed regions. The back plate in the configuration of FIG. 5 can have recesses but it is not necessary as the intermediate frame creates the cavities.

In an alternative, shown in FIG. 5, an intermediate frame 58 could be mounted on the substrate 12 or the back plate 30 and then the back plate applied. In this instance, the recessed regions are formed between the transparent substrate and the areas of the frame that do not contact the back plate.

In the alternative, the recessed regions could be formed as a function of the transparent substrate, rather than the back plate. For example, the transparent substrate could have integrated spacer posts or the integrated spacers could be on the back plate. The posts would be positioned to be between the multiple modulator arrays on the substrate. Another example would be to provide a back plate of a flexible, polymer sheet that can be flexed to allow the offset between the back plate and the substrate. The above examples are only intended as examples, and are not intended to limit application of the invention in any way.

Returning to FIG. 3, the process of applying desiccant may also have several variations. For example, the desiccant could be applied after the substrate and back plate were aligned and joined. A small hole could be left on the back of the back plate, allowing desiccant to be injected into the individual device packages. In this embodiment, sealing the back plate to the substrate also requires the application of a seal to the hole to complete the joining between the back plate and the substrate to form the package. In this case, the desiccant injection hole can also facilitate a continuous perimeter seal process eliminating the typical LCD-type endseal hole used in the perimeter seal. An embodiment of a substrate and back plate having these holes is shown in FIG. 6. The holes 60 in the back plate 30 would be sealed after injection of the desiccant.

The end seal may or may not be necessary. For example, an adhesive may be used in the areas between the modulator regions that allow the substrate to be scribed and broken without causing a break in the seal that requires an end seal process. In an initial non-continuous seal process the adhesive may be a material that can 'flow' such that the hole is filled in by the existing adhesive. In this embodiment, the seal would be self-healing, where self-healing is a mechanism where the adhesive is allowed to flow to close the hole that was initially present as the back plate and substrate were joined The adhesive or other material may move to fill the hole in ambient conditions or with heat application.

In an alternative to avoid the end seal process, the seal lines of joining the back plate to the transparent substrate may be formed to be extra wide. When the substrate is broken, the width of the seal line would prevent the seal from being broken. This may use up too much of the transparent substrate in unusable space, when compared to the cost and complexity of an end seal process. The costs and benefits may differ from process to process and the ultimate selection of which is more beneficial would be left to the process designer.

Figure 7:
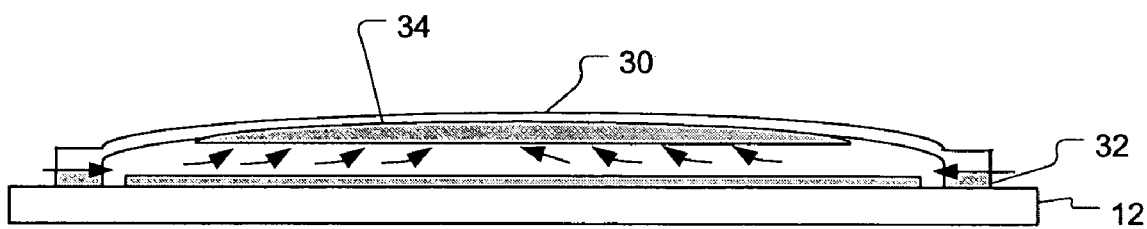
FIG. 7 shows an embodiment of an interferometric modulator packaging having a non-hermetic seal.

In this manner, the packaging of an interferometric MEMS modulator in ambient conditions is provided. As mentioned above, the adhesive or other joining material used to join the substrate to the back plate need not form a hermetic seal. A desiccant may be applied to handle any moisture from water vapor that enters the package. As can be seen in FIG. 7, the desiccant 34 absorbs the moisture that travels though the joint between the adhesive and either the back plate or the substrate as well as through the adhesive itself.

For example, it is desirable to keep the package as thin as possible for viable portable display application while still allowing enough desiccants to support the lifetime expectation of the device. One test predicted a reasonable lifetime of over 10 years at 40 degrees Celsius and 90% relative humidity. The adhesive seal was between 10 and 30 microns of thickness, 2 millimeters in width and a water vapor permeability coefficient of 0.2 to 0.4 gr-mm/m$^2$-kPa-day. These conditions are far more rugged than typical operating environments, but were indicative of the success of the package.

Thus, although there has been described to this point a particular embodiment for a method and apparatus for packaging interferometric modulators, it is not intended that such specific references be considered as limitations upon the scope of this invention except in-so-far as set forth in the following claims.

What is claimed is:

1. A method of packaging interferometric modulator arrays into individual devices, comprising:
    providing a transparent substrate;
    manufacturing interferometric modulator arrays on a back side of the substrate;
    providing a back plate;
    providing a desiccant;
    sealing the back plate to the backside of the substrate with a back seal, thereby forming multiple packages, wherein said desiccant is sealed inside said multiple packages;
    hardening the back seal;
    scribing the substrate between multiple packages; and
    breaking the substrate into individual devices.

2. The method of claim 1, the method comprising sealing in non-ambient conditions as a controlled environment of one of either inert gas or dry air.

3. The method of claim 1, the method further comprising: applying an end seal to the individual devices.

4. The method of claim 1, wherein providing a back plate comprises providing a back plate having recessed regions.

5. The method of claim 4, wherein providing a back plate with recessed regions comprises forming ribs on the back plate.

6. The method of claim 5, wherein forming ribs on the back plate comprises patterning ribs onto the back plate.

7. The method claim 5, wherein forming ribs on the back plate comprises printing a material onto the back plate.

8. The method of claim 5, wherein forming ribs on the back plate comprises stenciling a material onto the back plate.

9. The method of claim 4, wherein providing a back plate having recessed regions comprises eroding the back plate in those regions to form cavities.

10. The method of claim 4, wherein providing a back plate having recessed regions comprises providing a back plate having molding regions.

11. The method of claim 4, wherein providing a back plate having recessed regions comprises mounting a frame on a flat back plate, wherein the frame defines cavities between struts of the frame and the transparent substrate.

12. A method of packaging an interferometric modulator array, comprising:
    providing a transparent substrate;
    manufacturing interferometric modulator arrays on a back side of the substrate;

providing a back plate;
providing a desiccant; and
sealing the back plate to the backside of the substrate with a back seal, thereby forming a package, wherein said desiccant is sealed inside said package,
wherein providing a back plate further comprises providing a sheet of foil with integral spacer posts such that the spacer posts lie between multiple interferometric modulator arrays on the transparent substrate.

13. The method of claim 1, wherein providing a transparent substrate comprises providing a transparent substrate with recessed regions in which interferometric modulators are formed.

14. The method of claim 1, wherein providing a back plate comprises providing a flexible, polymer sheet.

15. The method of claim 1, wherein providing a transparent substrate comprises providing a transparent substrate having integrated spacers.

16. The method of claim 1, wherein applying the desiccant comprises:
aligning the transparent substrate to the back plate;
joining the transparent substrate to the back plate; and
sealing the back plate to the transparent substrate.

17. The method of claim 1, wherein applying the desiccant comprises:
applying the desiccant through a hole; and
sealing the hole.

18. The method of claim 1, wherein sealing the back plate to the transparent substrate comprises sealing the back plate to the transparent substrate with a self-healing seal.

19. The method of claim 1, wherein sealing the back plate to the transparent substrate comprises sealing a hole in the back plate.

20. A method of packaging interferometric modulator array devices, comprising:
providing a transparent substrate;
manufacturing interferometric modulator arrays on a back side of the substrate;
providing a back plate;
providing a desiccant;
sealing the back plate to the backside of the substrate with a back seal, thereby forming multiple packages, wherein said desiccant is sealed inside said multiple packages;
scribing the substrate between multiple packages; and
breaking the substrate into individual devices,
wherein sealing the back plate to the transparent substrate comprises forming a seal line wide enough such that the seal is not broken when the substrate is scribed and broken.

21. The method of claim 1, wherein sealing the back plate to the transparent substrate comprises sealing the back plate to the transparent substrate in an environment having a vacuum.

22. The method of claim 21, the method further comprising maintaining the vacuum pressure in the package.

23. A method of packaging an interferometric modulator, comprising:
providing a transparent substrate;
manufacturing an interferometric modulator on a back side of the substrate;
providing a back plate;
providing a desiccant; and
sealing the back plate to the backside of the substrate with a back seal, thereby forming a package, wherein said desiccant is sealed inside said package,
wherein sealing the back plate to the transparent substrate further comprises sealing the back plate to the transparent substrate in an environment having an initial vacuum, where environmental pressure increases from vacuum to a higher pressure as sealing occurs such that, as pressure in the package increases due to reduced volume, increased environmental pressure aids in creating a good seal.

24. The method of claim 1, wherein sealing the back plate to the transparent substrate comprises sealing the back plate to the transparent substrate in an environment having a pressure of higher than vacuum up to and including ambient pressure to form the seal.

25. The method of claim 23, wherein the method comprises maintaining the higher pressure up to and including ambient pressure in the package.

26. A method of packaging an interferometric modulator, comprising:
providing a transparent substrate;
manufacturing an interferometric modulator on a back side of the substrate;
providing a back plate;
providing a desiccant; and
sealing the back plate to the backside of the substrate with a back seal, thereby forming a package, wherein said desiccant is sealed inside said package,
wherein sealing the back plate to the transparent substrate further comprises sealing the back plate to the transparent substrate in an environment having an initial pressure higher than vacuum up to an including ambient pressure, where environmental pressure then increases to a higher pressure than the initial pressure as sealing occurs such that, as pressure in the package increases due to reduced volume, increased environmental pressure aids in creating a good seal.

27. A method of packaging an interferometric modulator, comprising:
providing a transparent substrate;
manufacturing an interferometric modulator on a back side of the substrate;
providing a back plate;
providing a desiccant; and
sealing the back plate to the backside of the substrate with a back seal, thereby forming a package, wherein said desiccant is sealed inside said package,
wherein sealing the back plate to the transparent substrate further comprises sealing the back plate to the transparent substrate in an environment having a pressure higher than ambient pressure to form the seal.

28. The method of claim 27, wherein the method comprises maintaining the higher pressure in the package.

29. A method of packaging an interferometric modulator, comprising:
providing a transparent substrate;
manufacturing an interferometric modulator on a back side of the substrate;
providing a back plate;
providing a desiccant; and
sealing the back plate to the backside of the substrate with a back seal, thereby forming a package, wherein said desiccant is sealed inside said package,
wherein sealing the back plate to the transparent substrate further comprises sealing the back plate to the transparent substrate in an environment having an initial environmental pressure higher than ambient pressure, wherein the environmental pressure then increases to a higher pressure than the initial pressure as sealing occurs such that, as pressure in the package increases due to reduced volume, increased environmental pressure aids in creating a good seal.

30. The method of claim 23, wherein the increased pressure inside the package during sealing creates a convex backplane shape by partial adhesive curing during a period of time in which the package is at the higher pressure.

31. The method of claim 26, wherein the increased pressure inside the cavity during sealing creates a convex backplane shape by partial adhesive curing during a period of time in which the cavity is at the higher pressure.

32. The method of claim 29, wherein the increased pressure inside the package during sealing creates a convex backplane shape by partial adhesive curing during a period of time in which the package is at the higher pressure.

33. A method of packaging interferometric modulator display devices, comprising:
providing a display panel comprising a transparent substrate, a plurality of interferometric modulator arrays formed on said transparent substrate, and a back plate sealed to said transparent substrate by a back seal to form multiple display panel packages;
hardening the back seal;
scribing the display panel between the multiple display panel packages; and
breaking the display panel into individual devices.

34. The method of claim 33, wherein said transparent substrate comprises glass.

35. The method of claim 33, further comprising applying an end seal to said individual devices.

36. The method of claim 33, wherein said backplate comprises glass.

37. The method of claim 36, wherein said transparent substrate comprises glass.

38. The method of claim 33, wherein scribing the display panel comprises scribing the transparent substrate.

39. The method of claim 33, wherein scribing the display panel comprises scribing the back plate.

* * * * *